United States Patent
Huang et al.

(10) Patent No.: US 10,021,732 B2
(45) Date of Patent: *Jul. 10, 2018

(54) NETWORK ACCESS METHOD, DEVICE, AND SYSTEM

(71) Applicant: HUAWEI DEVICE (DONGGUAN) CO., LTD., Dongguan (CN)

(72) Inventors: Xi Huang, Shenzhen (CN); Huangwei Wu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,353

(22) Filed: Jun. 27, 2017

(65) Prior Publication Data

US 2017/0295605 A1 Oct. 12, 2017

Related U.S. Application Data

(63) Continuation of application No. 14/851,321, filed on Sep. 11, 2015, now Pat. No. 9,712,952, which is a (Continued)

(30) Foreign Application Priority Data

Mar. 13, 2013 (CN) .......................... 2013 1 0079398

(51) Int. Cl.
*H04B 7/00* (2006.01)
*H04W 76/14* (2018.01)
(Continued)

(52) U.S. Cl.
CPC ........... *H04W 76/14* (2018.02); *H04W 4/008* (2013.01); *H04W 4/80* (2018.02); *H04W 12/06* (2013.01);
(Continued)

(58) Field of Classification Search
CPC ..... H04W 4/008; H04W 12/08; H04W 48/02; H04W 88/04; H04W 76/023;
(Continued)

(56) References Cited

U.S. PATENT DOCUMENTS 8,271,050 B2 9/2012 Weiss
2007/0192487 A1* 8/2007 Jakobson .............. G06F 21/554
709/225
(Continued)

FOREIGN PATENT DOCUMENTS

CN 1832481 9/2006
CN 102149167 8/2011
(Continued)

OTHER PUBLICATIONS

Chinese Office Action dated Sep. 26, 2016 in Chinese Patent Application No. 201310079398.8.
(Continued)

*Primary Examiner* — Nhan Le
(74) *Attorney, Agent, or Firm* — Staas & Halsey LLP

(57) ABSTRACT

Embodiments of the present invention disclose a network access method and device. The method includes: establishing a Bluetooth connection to a Bluetooth terminal; receiving, by using the Bluetooth connection, a network access request sent by the Bluetooth terminal; and if the Bluetooth terminal is an authorized device, activating a Bluetooth network sharing function automatically and forwarding the network access request to a wide area network. In the network access method and device provided in the present invention, a simple process and low time consumption are achieved for network access.

13 Claims, 6 Drawing Sheets

Related U.S. Application Data continuation of application No. PCT/CN2014/073335, filed on Mar. 13, 2014.

(51) Int. Cl.
| | |
|---|---|
| *H04W 76/02* | (2009.01) |
| *H04W 4/00* | (2018.01) |
| *H04W 12/06* | (2009.01) |
| *H04W 48/16* | (2009.01) |
| *H04W 76/06* | (2009.01) |
| *H04W 76/38* | (2018.01) |
| *H04W 4/80* | (2018.01) |
| *H04W 88/04* | (2009.01) |

(52) U.S. Cl.
CPC ......... *H04W 48/16* (2013.01); *H04W 76/023* (2013.01); *H04W 76/068* (2013.01); *H04W 76/38* (2018.02); *H04W 88/04* (2013.01)

(58) Field of Classification Search
CPC ..... H04W 84/18; H04W 88/06; H04W 8/245; H04W 24/02; H04W 88/02
USPC ........ 455/41.1, 41.2, 418–420, 422.1, 432.1, 455/435.1, 550.1; 370/328, 338
See application file for complete search history.

(56) References Cited

U.S. PATENT DOCUMENTS

| | | |
|---|---|---|
| 2010/0082485 A1 | 4/2010 | Lin et al. |
| 2010/0278345 A1 | 11/2010 | Alsina et al. |
| 2011/0003549 A1 | 1/2011 | Eisenbach |
| 2011/0028085 A1* | 2/2011 | Waung .................. H04W 88/04 455/7 |
| 2012/0108208 A1 | 5/2012 | Willis |
| 2013/0171967 A1* | 7/2013 | Ashour ............... H04M 1/7253 455/411 |
| 2013/0237151 A1 | 9/2013 | Yu |
| 2014/0075523 A1 | 3/2014 | Tuomaala |

FOREIGN PATENT DOCUMENTS

| | | |
|---|---|---|
| CN | 102461128 | 5/2012 |
| EP | 1 701 483 A1 | 9/2006 |
| EP | 2 355 563 A1 | 8/2011 |
| GB | 2 433 393 A | 6/2007 |

OTHER PUBLICATIONS

Extended European Search Report dated Dec. 8, 2015 in corresponding European Patent Application No. 14763524.7.
International Search Report dated May 27, 2014 in corresponding International Application PCT/CN2014/073335.
U.S. Office Action dated Jun. 24, 2016 in U.S. Appl. No. 14/851,321.
U.S. Final Office Action dated Dec. 7, 2016 in U.S. Appl. No. 14/851,321.
U.S. Notice of Allowance dated Mar. 14, 2017 in U.S. Appl. No. 14/851,321.
U.S. Appl. No. 14/851,321, filed Sep. 11, 2015, Xi Huang et al., Huawei Device Co., Ltd.

* cited by examiner

NETWORK ACCESS METHOD, DEVICE, AND SYSTEM

CROSS REFERENCE AND RELATED APPLICATIONS

This application is a continuation of U.S. application Ser. No. 14/851,321, filed on Sep. 11, 2015, which is a continuation of International Application No. PCT/CN2014/073335, filed on Mar. 13, 2014, which claims priority to Chinese application No. 201310079398.8, filed on Mar. 13, 2013, all of the afore-mentioned patent applications are hereby incorporated by reference in their entireties.

TECHNICAL FIELD

Embodiments of the present invention relate to the field of communications technologies, and in particular, to a network access method, device, and system.

BACKGROUND

An electronic device such as a personal digital assistance (Personal Digital Assistance, PDA) and a mobile phone can access a network, so as to implement operations such as web browsing, email sending and receiving, and data downloading. The electronic device can access a network in multiple manners. For example, the mobile phone can access a 3G or 4G network by using a subscriber identity module (Subscriber Identity Module, SIM) card; and the PDA can access the Internet network by using a Wireless Fidelity (Wireless Fidelity, Wi-Fi) hotspot. However, in an area beyond the coverage of the Wi-Fi hotspot, the PDA cannot access the network by using the Wi-Fi hotspot.

At present, some electronic devices provide a Bluetooth access point (Access Point, AP) function, that is, a Bluetooth network sharing function. By using the Bluetooth network sharing function, these electronic devices can serve as an AP to provide another electronic device that needs to access the network with a network connection. Based on the foregoing Bluetooth network sharing function, in an area beyond the coverage of a Wi-Fi hotspot, the PDA can access the network by using the electronic device having the Bluetooth network sharing function. For example, the PDA may access the network by using a mobile phone having the Bluetooth network sharing function, and a network access process is that: The mobile phone establishes a Bluetooth connection to the PDA, and then a user turns on the Bluetooth network sharing function of the mobile phone manually, so as to provide the PDA with a network connection.

However, in the foregoing method in which the PDA accesses the network by using a mobile phone having the Bluetooth network sharing function, for each operation, the user needs to turn on the Bluetooth network sharing function (Bluetooth AP function) of the electronic device through manual configuration, which is a troublesome process and leads to an excessively long time to access a network.

SUMMARY

The present invention provides a network access method, device, and system, which achieves a simple operation and low time consumption for a Bluetooth terminal to access a network.

A first aspect of the present application provides a network access method, including:

establishing a Bluetooth connection to a Bluetooth terminal;

receiving, by using the Bluetooth connection, a network access request sent by the Bluetooth terminal; and if the Bluetooth terminal is an authorized device, activating a Bluetooth network sharing function automatically and forwarding the network access request to a wide area network.

In a first possible implementation manner of the first aspect, before the establishing a Bluetooth connection to a Bluetooth terminal, the method further includes:

performing Bluetooth pairing with the Bluetooth terminal, and during a process of the Bluetooth pairing, receiving an authorization request sent by the Bluetooth terminal; and accepting the authorization request, and identifying the Bluetooth terminal as an authorized device.

In a second possible implementation manner of the first aspect, after the establishing a Bluetooth connection to a Bluetooth terminal and before the determining whether the Bluetooth terminal is an authorized device, the method further includes:

prompting a user to input an authorization confirmation instruction of the Bluetooth terminal by using a human-computer interaction manner; and after the authorization confirmation instruction is received, identifying the Bluetooth terminal as an authorized device.

With reference to the first aspect of the present application, the first possible implementation manner of the first aspect, or the second possible implementation manner of the first aspect, in a third possible implementation manner, the method further includes:

after the network access request is forwarded to the wide area network, if a new network access request is not received within a preset time, turning off the Bluetooth network sharing function.

A second aspect of the present application provides a computer storage medium, where, the computer storage medium stores a computer program, and when the computer program in the computer storage medium is read in a computer, the computer program can enable the computer to implement the steps according to any possible implementation of the first aspect of present application.

A third aspect of the present application provides a network access device, including:

a connection module, configured to perform Bluetooth connection to a Bluetooth terminal;

a receiving module, configured to receive a network access request sent by the Bluetooth terminal connected to the Bluetooth connection module;

an activating module, configured to activate a Bluetooth network sharing module automatically when the Bluetooth terminal is an authorized device; and the Bluetooth network sharing module, configured to forward the network access request received by the receiving module to a wide area network.

In a first possible implementation manner of the third aspect, the device further includes a pairing module and a first authorization module, where, the pairing module is configured to perform Bluetooth pairing with the Bluetooth terminal, and during a process of the Bluetooth pairing, receive an authorization request sent by the Bluetooth terminal; and the first authorization module is configured to accept the authorization request received by the pairing module and identify the Bluetooth terminal as an authorized device.

In a second possible implementation manner of the third aspect, the device further includes a human-computer interaction module and a second authorization module, where, the human-computer interaction module is configured to prompt a user to input an authorization confirmation instruction of the Bluetooth terminal by using a human-computer interaction manner; and the second authorization module is configured to identify the Bluetooth terminal as an authorized device according to the authorization confirmation instruction received by the human-computer interaction module.

With reference to the third aspect of the present application, the first possible implementation manner of the third aspect, or the second possible implementation manner of the third aspect, in a third possible implementation manner, the device further includes:

a turn-off module, configured to: after the Bluetooth network sharing module forwards the network access request to the wide area network, if a new network access request is not received within a preset time, turn off the Bluetooth network sharing function.

A fourth aspect of the present application provides a network access device, including a memory and a processor, where, the memory is configured to store a set of program code; and the processor is configured to call the program code stored in the memory and execute:

establishing a Bluetooth connection to a Bluetooth terminal;

receiving, by using the Bluetooth connection, a network access request sent by the Bluetooth terminal; and if the Bluetooth terminal is an authorized device, activating a Bluetooth network sharing function automatically and forwarding the network access request to a wide area network.

In a first possible implementation manner of the fourth aspect, before the establishing a Bluetooth connection to a Bluetooth terminal, the processor is further configured to execute:

performing Bluetooth pairing with the Bluetooth terminal, and during a process of the Bluetooth pairing, receiving an authorization request sent by the Bluetooth terminal; and accepting the authorization request, and identifying the Bluetooth terminal as an authorized device.

In a second possible implementation manner of the fourth aspect, after the establishing a Bluetooth connection to a Bluetooth terminal and before the determining whether the Bluetooth terminal is an authorized device, the processor is further configured to execute:

prompting a user to input an authorization confirmation instruction of the Bluetooth terminal by using a human-computer interaction manner; and after the authorization confirmation instruction is received, identifying the Bluetooth terminal as an authorized device.

With reference to the fourth aspect of the present application, the first possible implementation manner of the fourth aspect, or the second possible implementation manner of the fourth aspect, in a third possible implementation manner, the processor is further configured to execute:

after the network access request is forwarded to the wide area network, if a new network access request is not received within a preset time, turning off the Bluetooth network sharing function.

A fifth aspect of the present application provides a network access system, including a Bluetooth terminal and a network access device, where, the Bluetooth terminal is configured to: after establishing a Bluetooth connection to the network access device, send a network access request to the network access device; and the network access device is configured to: when the Bluetooth terminal is an authorized device or not, activate a Bluetooth network sharing function automatically and forward the network access request to a wide area network.

In a first possible implementation manner of the fifth aspect, before the establishing a Bluetooth connection to the Bluetooth terminal, the network access device is further configured to:

perform Bluetooth pairing with the Bluetooth terminal, and during a process of the Bluetooth pairing, receive an authorization request sent by the Bluetooth terminal; and identify the Bluetooth terminal as an authorized device.

In a second possible implementation manner of the fifth aspect, after the establishing a Bluetooth connection to the Bluetooth terminal and before the determining whether the Bluetooth terminal is an authorized device, the network access device is further configured to:

prompt a user to input an authorization confirmation instruction of the Bluetooth terminal by using a human-computer interaction manner; and after the authorization confirmation instruction is received, identify the Bluetooth terminal as an authorized device.

With reference to the fifth aspect of the present application, the first possible implementation manner of the fifth aspect, or the second possible implementation manner of the fifth aspect, in a third possible implementation manner, the network access device is further configured to:

after the network access request is forwarded to the wide area network, when a new network access request is not received within a preset time, turn off the Bluetooth network sharing function.

In the present invention, when a network access request sent by a Bluetooth terminal is received, and when it is determined that the Bluetooth terminal is an authorized device, a Bluetooth network sharing function is activated automatically and the network access request is forwarded to a wide area network, so as to enable the Bluetooth terminal to access a network. When a Bluetooth terminal that needs to access a network is an authorized device, a Bluetooth network sharing function can be activated automatically in the present invention, so as to achieve a simple operation and low time consumption for a Bluetooth terminal to access a network.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
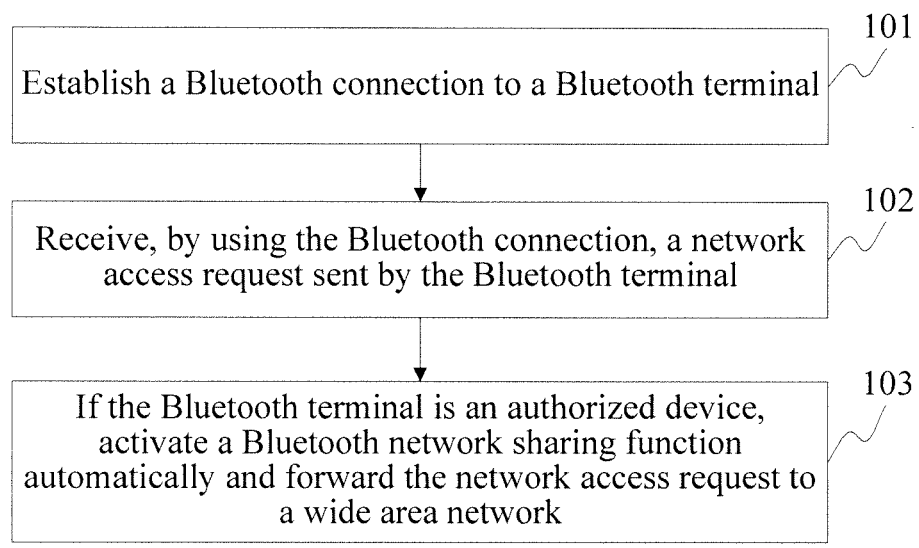
FIG. 1 is a flowchart of a network access method according to an embodiment of the present invention.

Referring to FIG. 1, FIG. 1 is a flowchart of a network access method according to an embodiment of the present invention. This embodiment is executed by an electronic device having a Bluetooth AP function, for example, a mobile phone. A Bluetooth terminal described in this embodiment is an electronic device that has a Bluetooth function and needs to access a network, for example, a PDA. As shown in FIG. 1, the network access method provided in this embodiment includes:

101. Establish a Bluetooth connection to a Bluetooth terminal.

102. Receive, by using the Bluetooth connection, a network access request sent by the Bluetooth terminal.

After the connection is established to the Bluetooth terminal, if the Bluetooth terminal needs to access a network, the Bluetooth terminal sends the network access request, for example, a Hyper Text Transportation Protocol (Hyper Text Transportation Protocol, HTTP) request.

Optionally, in a possible implementation manner of this embodiment, before the Bluetooth connection to the Bluetooth terminal is established, the network access method provided in this embodiment may further include:

performing Bluetooth pairing with the Bluetooth terminal, and during a process of the Bluetooth pairing, receiving an authorization request sent by the Bluetooth terminal; and accepting the authorization request, and identifying the Bluetooth terminal as an authorized device.

For security reasons, Bluetooth pairing needs to be performed before communication is performed between two Bluetooth devices, and then data can be exchanged. Pairing (also referred to as binding sometimes) refers to a process in which two Bluetooth devices exchange protection keys with each other. After pairing succeeds, all information sent between the Bluetooth devices by using the Bluetooth connection is encrypted and can only reach a Bluetooth device that is permitted by the pairing to receive the information. Once pairing between the Bluetooth devices succeeds, the connection can be established.

By using signaling in a process of the Bluetooth pairing, the entity executing this embodiment can receive the authorization request. The authorization request may be a protocol agreed upon between the entity executing this embodiment and the Bluetooth terminal. After receiving the protocol, the entity executing this embodiment accepts the authorization request and identifies the Bluetooth terminal as an authorized device automatically.

Optionally, in another possible implementation manner of this embodiment, after the entity executing this embodiment establishes the Bluetooth connection to the Bluetooth terminal and before the entity executing this embodiment determines whether the Bluetooth terminal is an authorized device, the network access method provided in this embodiment may further include:

prompting a user to input an authorization confirmation instruction of the Bluetooth terminal by using a human-computer interaction manner; and after the authorization confirmation instruction is received, identifying the Bluetooth terminal as an authorized device.

The entity executing this embodiment stores an authorization record. When an authorized Bluetooth terminal initiates a network request again, the entity executing this embodiment can directly search the authorization record to find whether the Bluetooth terminal that initiates the network request currently is an authorized device.

103. If the Bluetooth terminal is an authorized device, activate a Bluetooth network sharing function automatically and forward the network access request to a wide area network.

The entity executing this embodiment determines whether the Bluetooth terminal that initiates the network access request currently is an authorized device. If the Bluetooth terminal is an authorized device, the entity executing this embodiment activates the Bluetooth network sharing function automatically. Optionally, a method for determining whether the Bluetooth device that initiates the network access request is an authorized device may be: searching an authorization record to find whether authorization for the Bluetooth device is included, where if the authorization for the Bluetooth device is included, the Bluetooth device is an authorized device.

The entity executing this embodiment can provide the Bluetooth terminal with a network access service by means of an access control list (Access Control List, ACL) of Bluetooth. When the Bluetooth terminal is an authorized device, the entity executing this embodiment activates the Bluetooth network sharing function automatically and forwards the network access request to a corresponding server in the wide area network by means of the ACL, so as to obtain requested content.

Optionally, in order to prevent the Bluetooth network sharing function from being activated in a case in which the Bluetooth network sharing function is not required, which leads to a waste of power and resources, and also in order to further improve user experience, in this embodiment, after the network access request is received and the network access request is forwarded to the wide area network, if a new network access request is not received within a preset time, the Bluetooth network sharing function is turned off. The preset time herein may be set to a proper time value according to a specific application, which is not limited herein.

This embodiment further protects a computer storage medium. The computer storage medium stores a computer program, and when the computer program in the computer storage medium is read in a computer, the computer program can enable the computer to implement the foregoing steps in this embodiment.

In this embodiment, when a network access request sent by a Bluetooth terminal is received, and when it is determined that the Bluetooth terminal is an authorized device, a Bluetooth network sharing function is activated automatically and the network access request is forwarded to a wide area network, so as to enable the Bluetooth terminal to access a network. When a Bluetooth terminal that needs to access a network is an authorized device, a Bluetooth network sharing function can be activated automatically in the present invention, so as to achieve a simple operation and low time consumption for a Bluetooth terminal to access a network.

Figure 2:
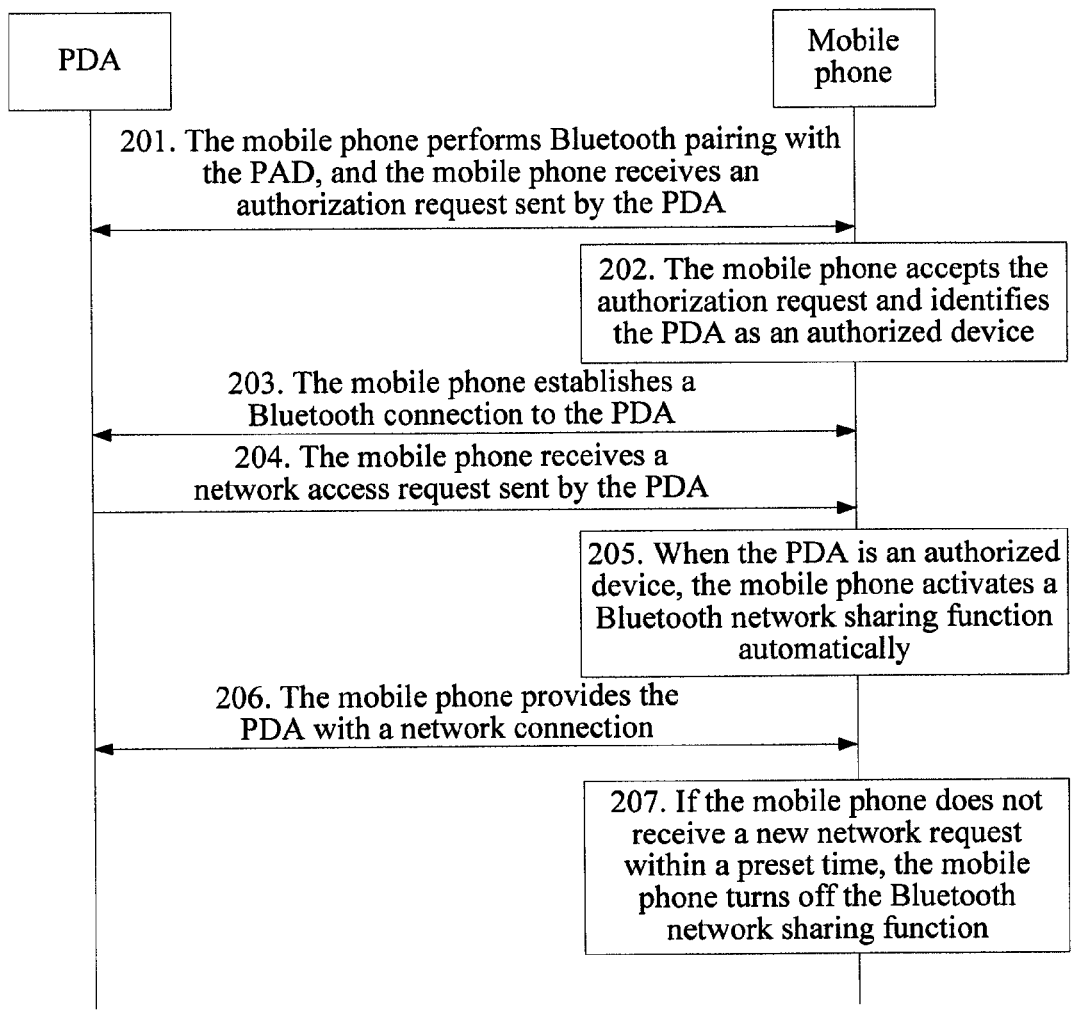
FIG. 2 is a flowchart of another network access method according to an embodiment of the present invention.

Referring to FIG. 2, FIG. 2 is a flowchart of another network access method according to an embodiment of the present invention, where a Bluetooth terminal is a PDA, and an electronic device that provides the PDA with a Bluetooth network sharing function is a mobile phone having a Bluetooth AP function. As shown in FIG. 2, the method in this embodiment includes:

201. A mobile phone performs Bluetooth pairing with a PDA, and the mobile phone receives an authorization request sent by the PDA.

Optionally, by using signaling in a process of the Bluetooth pairing, the PDA sends an authorization request, and the authorization request may be a protocol agreed upon between the mobile phone and the PDA.

202. The mobile phone accepts the authorization request and identifies the PDA as an authorized device.

203. The mobile phone establishes a Bluetooth connection to the PDA.

204. The mobile phone receives a network access request sent by the PDA.

The network access request may be an HTTP request.

205. When the PDA is an authorized device, the mobile phone activates the Bluetooth network sharing function.

206. The mobile phone provides the PDA with a network connection.

For a method for providing the PDA with a network connection by the mobile phone, refer to the embodiment of FIG. 1, and details are not described herein again.

207. If the mobile phone does not receive a new network request within a preset time, the mobile phone turns off the Bluetooth network sharing function.

After the mobile phone forwards a previous network access request to a wide area network, if a new network access request is not received within a preset time, the mobile phone turns off the Bluetooth network sharing function.

In this embodiment, by using signaling in a process of Bluetooth pairing, a PDA sends an agreed-upon authorization request protocol to a mobile phone, so that the mobile phone identifies the PDA as an authorized device, and when the PDA initiates a network request subsequently, the mobile phone identifies the PDA automatically and turns on a Bluetooth AP function for the PDA. In this embodiment, the PDA can access a network by using Bluetooth without Wi-Fi, achieving a simple process and low time consumption for network access.

Figure 3:
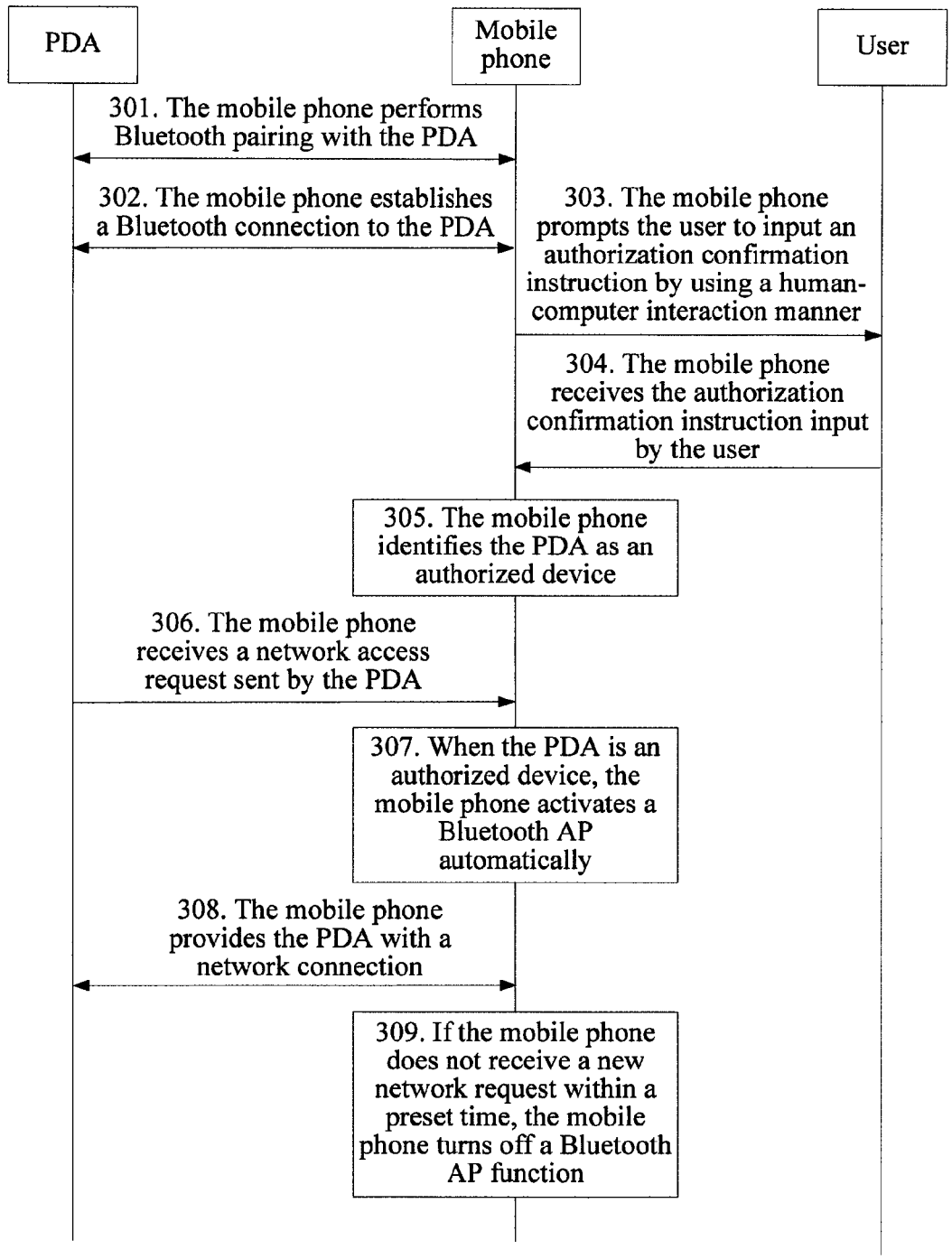
FIG. 3 is a flowchart of still another network access method according to an embodiment of the present invention.

Referring to FIG. 3, FIG. 3 is a flowchart of still another network access method according to an embodiment of the present invention, where a Bluetooth terminal is a PDA, and an electronic device that provides the PDA with a Bluetooth network sharing function is a mobile phone having a Bluetooth AP function. As shown in FIG. 3, the method in this embodiment includes:

301. A mobile phone performs Bluetooth pairing with a PDA.

302. The mobile phone establishes a Bluetooth connection to the PDA.

303. The mobile phone prompts a user to input an authorization confirmation instruction by using a human-computer interaction manner.

The human-computer interaction manner may be: the mobile phone displays, on a screen, information that prompts the user whether to confirm authorization for the device, and the user may confirm authorization by using a corresponding confirmation button and may abandon authorization by using a corresponding cancel button.

304. The mobile phone receives the authorization confirmation instruction input by the user.

305. The mobile phone identifies the PDA as an authorized device.

When the user inputs the authorization confirmation instruction by using the corresponding confirmation button, the mobile phone identifies the PDA as an authorized device after receiving the confirmation instruction.

306. The mobile phone receives a network access request sent by the PDA.

The network access request may be an HTTP request.

Step 303 to step 305 may also be executed after step 306. After the mobile phone performs the Bluetooth pairing with the PDA, the mobile phone does not immediately prompt the user to input an authorization confirmation instruction. However, after step 306, the mobile phone is triggered to execute step 303 after receiving the network access request sent by the PDA, and execute step 305 after receiving the authorization confirmation instruction input by the user.

307. When the PDA is an authorized device, the mobile phone activates the Bluetooth network sharing function.

308. The mobile phone provides the PDA with a network connection.

For a method for providing the PDA with a network connection by the mobile phone, refer to the embodiment of FIG. 1, and details are not described herein again.

309. If the mobile phone does not receive a new network request within a preset time, the mobile phone turns off the Bluetooth network sharing function.

After the mobile phone forwards a previous network access request to a wide area network, if the mobile phone does not receive a new network access request within a preset time, the mobile phone turns off the Bluetooth network sharing function. For details, refer to the embodiment of FIG. 1, and details are not described herein again.

In this embodiment, authorization for a PDA by a mobile phone needs to be confirmed by a user manually, and the user determines whether to authorize the PDA to use a Bluetooth AP function, which can prevent a case in which any PDA can access a network by using the mobile phone of the user, which leads to a resource waste of the mobile phone of the user.

Figure 4:
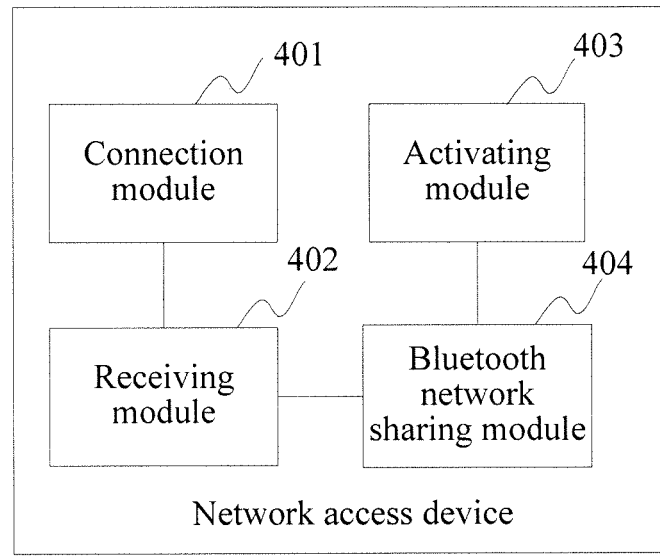
FIG. 4 is a structural diagram of a network access device according to an embodiment of the present invention.

Referring to FIG. 4, FIG. 4 is a structural diagram of a network access device according to an embodiment of the present invention. The network access device may be a mobile phone having a Bluetooth AP function, and the like. The network access device includes:

a connection module 401, configured to perform Bluetooth connection to a Bluetooth terminal;

a receiving module 402, configured to receive a network access request sent by the Bluetooth terminal connected to the Bluetooth connection module 401;

an activating module 403, configured to activate a Bluetooth network sharing module 405 automatically when the network access device is an authorized device; and the Bluetooth network sharing module 404 is configured to forward the network access request received by the receiving module 402 to a wide area network.

Figure 5:
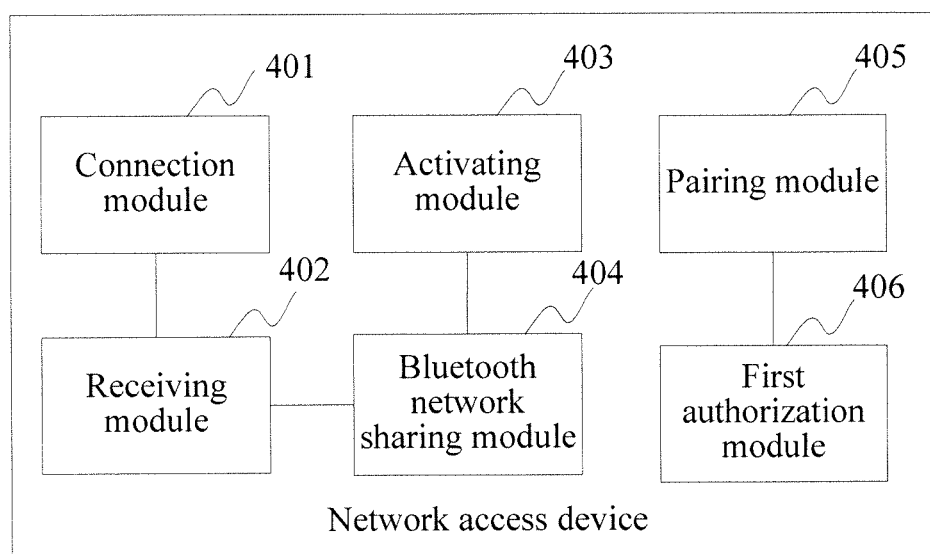
FIG. 5 is a structural diagram of another network access device according to an embodiment of the present invention.

Optionally, in a possible implementation manner of the network access device provided in this embodiment, the network access device may also include a pairing module 405 and a first authorization module 406, where, as shown in FIG. 5:

the pairing module 405 is configured to perform Bluetooth pairing with the Bluetooth terminal, and during a process of the Bluetooth pairing, receive an authorization request sent by the Bluetooth terminal; and the first authorization module 406 is configured to accept the authorization request received by the pairing module 405 and identify the Bluetooth terminal as an authorized device.

In this implementation manner, by using signaling in a process of the Bluetooth pairing, the Bluetooth terminal sends an agreed-upon authorization request protocol to the mobile phone, so that the network access device identifies the Bluetooth terminal as an authorized device, and when the Bluetooth terminal initiates a network request again subsequently, the network access device identifies the Bluetooth terminal automatically and turns on the Bluetooth AP function for the Bluetooth terminal.

Figure 6:
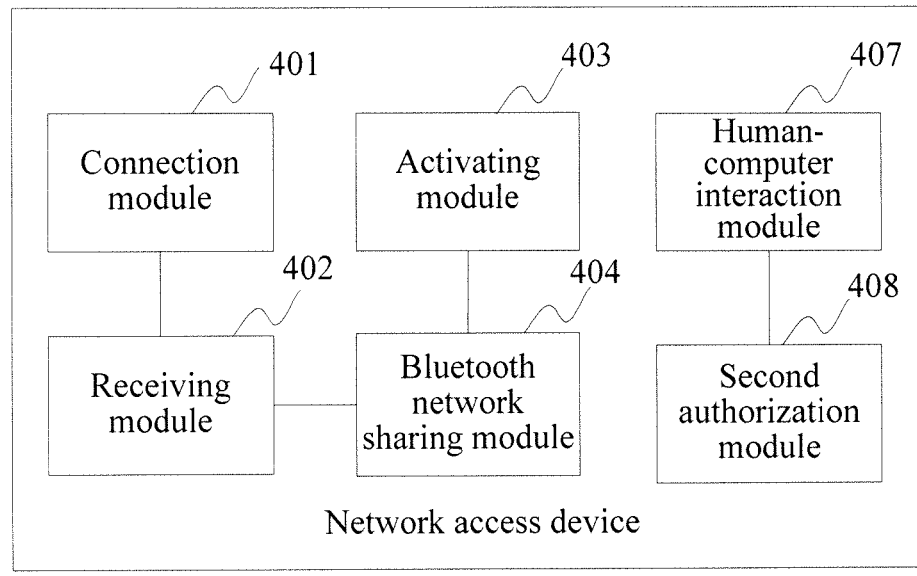
FIG. 6 is a structural diagram of still another network access device according to an embodiment of the present invention.

Optionally, in a possible implementation manner of the network access device provided in this embodiment, the network access device may also include a human-computer interaction module 407 and a second authorization module 408, where, as shown in FIG. 6:

the human-computer interaction module 407 is configured to prompt a user to input an authorization confirmation instruction of the Bluetooth terminal by using a human-computer interaction manner; and the second authorization module 408 is configured to identify, according to the authorization confirmation instruction received by the human-computer interaction module 407, the Bluetooth terminal as an authorized device; where in specific implementation, the second authorization module 408 may identify the Bluetooth terminal corresponding to the authorization instruction as an authorized device after the human-computer interaction module 407 receives the authorization confirmation instruction.

In this implementation manner, authorization for the Bluetooth terminal by the network access device needs to be confirmed by the user manually, and the user determines whether to authorize the Bluetooth terminal to share the Bluetooth network function, which can prevent a case in which any Bluetooth terminal can access a network by using the network access device, which leads to a resource waste of the network access device.

Figure 7:
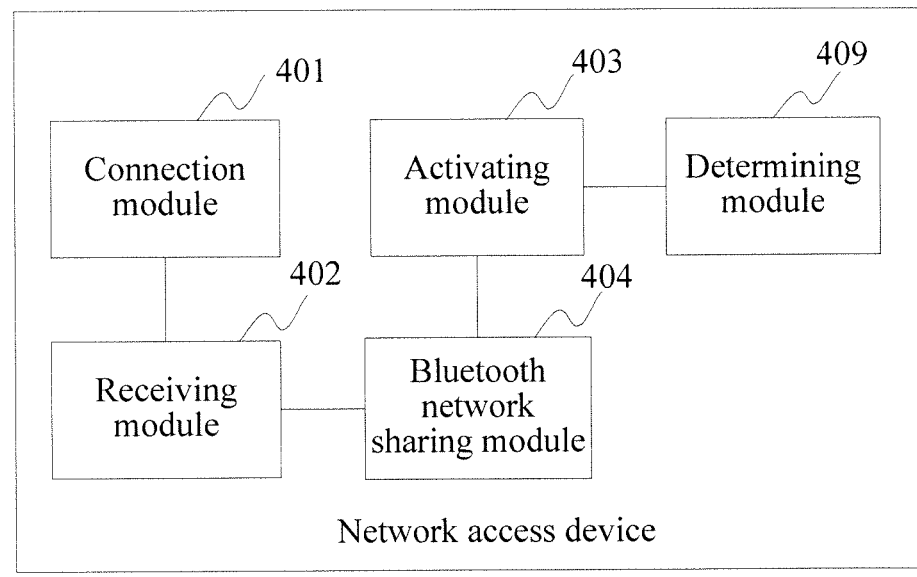
FIG. 7 is a structural diagram of still yet another network access device according to an embodiment of the present invention.

Optionally, this embodiment may further include a determining module 409, as shown in FIG. 7. The determining module 409 is configured to determine whether the Bluetooth device that initiates the network access request currently is an authorized device. For a specific determining method, refer to the foregoing embodiments for a specific determining method, and details are not described herein again. A determining result of the determining module 409 serves as a basis for whether to activate the Bluetooth network sharing module 405 by the activating module 403. For details, refer to the foregoing description of the activating module 403, and details are not described herein again.

After the network access device provided in this embodiment succeeds in performing Bluetooth pairing with a Bluetooth terminal and establishes a Bluetooth connection, the network access device, after receiving a network request sent by the Bluetooth terminal, determines whether the Bluetooth terminal is an authorized device, and if the Bluetooth terminal is an authorized device, a Bluetooth network sharing function is activated automatically, so as to enable the Bluetooth terminal to access a network. The network access device provided in this embodiment achieves a simple process and low time consumption for a Bluetooth terminal to access a network.

Figure 8:
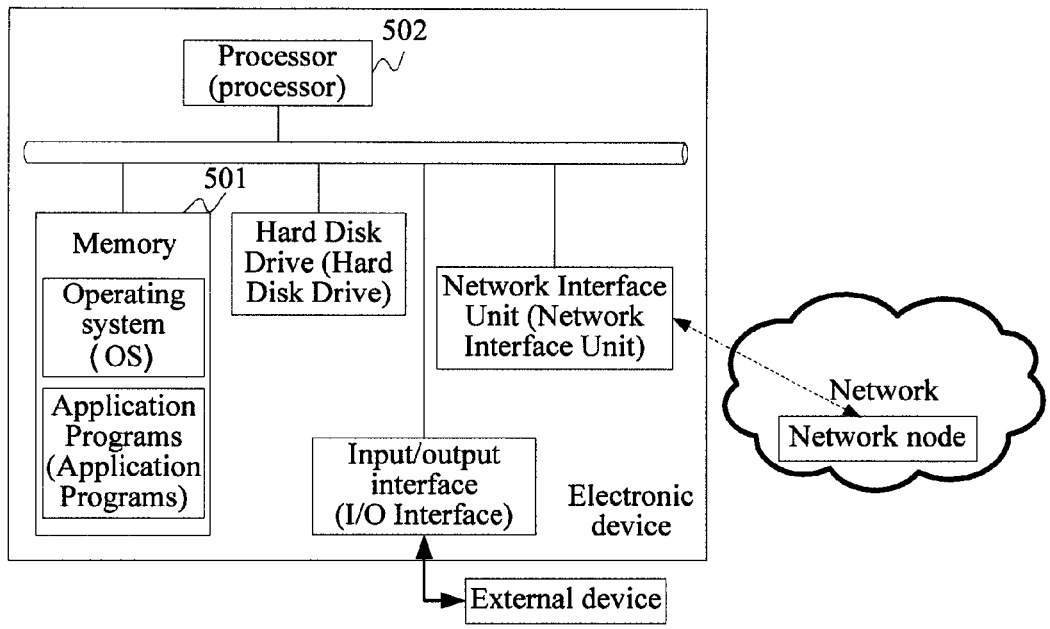
FIG. 8 is a structural diagram of a network access device according to an embodiment of the present invention.

Referring to FIG. 8, FIG. 8 is a structural diagram of a network access device according to an embodiment of the present invention, and the network access device includes a memory 501 and a processor 502, where:

the memory 501 is configured to store a set of program code; and the processor 502 is configured to call the program code stored in the memory 501 and execute:

establishing a Bluetooth connection to a Bluetooth terminal;

receiving, by using the Bluetooth connection, a network access request sent by the Bluetooth terminal; and if the Bluetooth terminal is an authorized device, activating a Bluetooth network sharing function automatically and forwarding the network access request to a wide area network.

Optionally, before establishing the Bluetooth connection to the Bluetooth terminal, the processor 502 is further configured to execute:

performing Bluetooth pairing with the Bluetooth terminal, and during a process of the Bluetooth pairing, receiving an authorization request sent by the Bluetooth terminal; and identifying the Bluetooth terminal as an authorized device.

Optionally, after establishing the Bluetooth connection to the Bluetooth terminal and before determining whether the Bluetooth terminal is an authorized device, the processor 502 is further configured to execute:

prompting a user to input an authorization confirmation instruction of the Bluetooth terminal by using a human-computer interaction manner; and after the authorization confirmation instruction is received, identifying the Bluetooth terminal as an authorized device.

Optionally, the processor 502 is further configured to execute:

after the network access request is forwarded to the wide area network, if a new network access request is not received within a preset time, turning off the Bluetooth network sharing function.

After the network access device provided in this embodiment succeeds in performing Bluetooth pairing with a Bluetooth terminal and establishes a Bluetooth connection, the network access device, after receiving a network request sent by the Bluetooth terminal, determines whether the Bluetooth terminal is an authorized device, and if the Bluetooth terminal is an authorized device, a Bluetooth network sharing function is activated automatically, so that the Bluetooth terminal accesses a network. The network access device provided in this embodiment achieves a simple process and low time consumption for a Bluetooth terminal to access a network.

Figure 9:
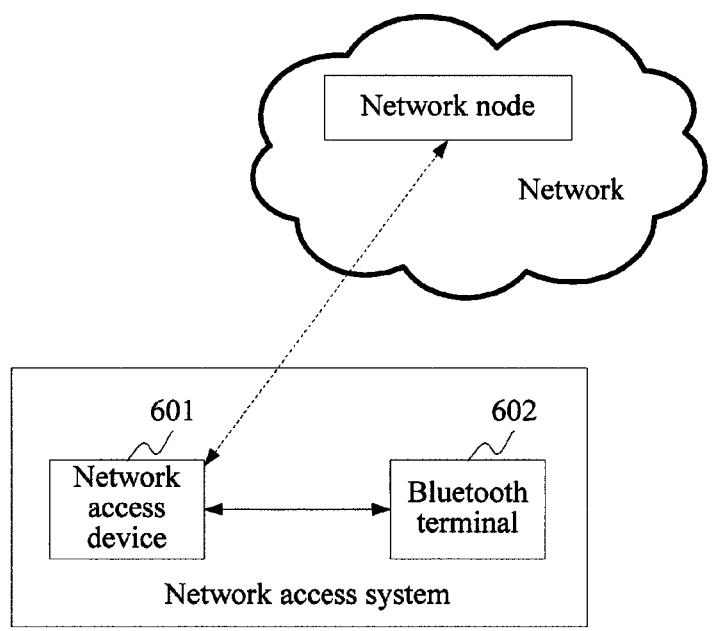
FIG. 9 is a structural diagram of a network access system according to an embodiment of the present invention.

Referring to FIG. 9, FIG. 9 is a structural diagram of a network access system according to an embodiment of the present invention, and the network access system includes a Bluetooth terminal 601 and a network access device 602.

The Bluetooth terminal 601 is configured to: after establishing a Bluetooth connection to the network access device 602, send a network access request to the network access device 602.

The network access device 602 is configured to: when the Bluetooth terminal 601 is an authorized device, activate a Bluetooth network sharing function automatically and forward the network access request to a wide area network.

Optionally, in a possible implementation manner of the network access system provided in this embodiment, before establishing the Bluetooth connection to the Bluetooth terminal 601, the network access device 602 is further configured to:

perform Bluetooth pairing with the Bluetooth terminal 601, and during a process of the Bluetooth pairing, receive an authorization request sent by the Bluetooth terminal 601; and accept the authorization request, and identify the Bluetooth terminal 601 as an authorized device.

Optionally, in another possible implementation manner of the network access system provided in this embodiment, after establishing the Bluetooth connection to the Bluetooth terminal 601 and before determining whether the Bluetooth terminal 601 is an authorized device, the network access device 602 is further configured to:

prompt a user to input an authorization confirmation instruction of the Bluetooth terminal 601 by using a human-computer interaction manner; and after the authorization confirmation instruction is received, identify the Bluetooth terminal 601 as an authorized device.

Optionally, the network access device 602 is further configured to:

after the network access request is forwarded to the wide area network, if a new network access request is not received within a preset time, turn off the Bluetooth network sharing function.

In this embodiment, after the network access device succeeds in performing Bluetooth pairing with a Bluetooth terminal and establishes a Bluetooth connection, the network access device, after receiving a network request sent by the Bluetooth terminal, determines whether the Bluetooth terminal is an authorized device, and if the Bluetooth terminal is an authorized device, a Bluetooth network sharing function is activated automatically, so as to enable the Bluetooth terminal to access a network. In this embodiment, a simple process operation and low time consumption are achieved for a Bluetooth terminal to access a network.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A network access method, comprising:

establishing, by a wide area network terminal, a Bluetooth connection to a Bluetooth terminal;

receiving, by using the Bluetooth connection, a network access request of an application sent by the Bluetooth terminal, wherein the application is installed on the Bluetooth terminal and the wide area network terminal; and when the Bluetooth terminal is an authorized device, forwarding the network access request to a wide area network.

2. The method according to claim 1, wherein before the establishing of the Bluetooth connection to the Bluetooth terminal, the method further comprises:

performing Bluetooth pairing with the Bluetooth terminal, and during a process of the Bluetooth pairing, receiving an authorization request sent by the Bluetooth terminal; and accepting the authorization request, and identifying the Bluetooth terminal as the authorized device.

3. The method according to claim 1, wherein after the establishing of the Bluetooth connection to the Bluetooth terminal and before the determining of whether the Bluetooth terminal is the authorized device, the method further comprises:

prompting a user to input an authorization confirmation instruction of the Bluetooth terminal by using a user interface; and after the authorization confirmation instruction is received, identifying the Bluetooth terminal as the authorized device.

4. The method according to claim 1, wherein:

the network access request is forwarded by using a Bluetooth network sharing function.

5. The method according to claim 4, further comprising:

after the network access request is forwarded to the wide area network, when a new network access request is not received within a preset time, turning off the Bluetooth network sharing function.

6. The method according to claim 1, further comprising automatically activating a Bluetooth network sharing function before forwarding the network access request to the wide area network when the Bluetooth terminal is the authorized device.

7. At least one non-transitory computer readable medium storing computer readable instructions which when executed control at least one processor to implement the method according to claim 1.

8. A wide area network terminal, comprising:

at least one memory configured to store computer readable instructions; and at least one hardware processor configured to access the computer readable instructions stored in the at least one memory and to execute the computer readable instructions to implement:

establishing a Bluetooth connection to a Bluetooth terminal;

receiving, by using the Bluetooth connection, a network access request of an application sent by the Bluetooth terminal, wherein the application is installed on the Bluetooth terminal and the wide area network terminal; and when the Bluetooth terminal is an authorized device, forwarding the network access request to a wide area network.

9. The wide area network terminal according to claim 8, wherein before the establishing of the Bluetooth connection to the Bluetooth terminal, the at least one processor is further configured to execute computer readable instructions to implement:

performing Bluetooth pairing with the Bluetooth terminal, and during a process of the Bluetooth pairing, receiving an authorization request sent by the Bluetooth terminal; and accepting the authorization request, and identifying the Bluetooth terminal as the authorized device.

10. The wide area network terminal according to claim 8, wherein after the establishing of the Bluetooth connection to the Bluetooth terminal and before the determining of whether the Bluetooth terminal is the authorized device, the at least one processor is further configured to execute computer readable instructions to implement:

prompting a user to input an authorization confirmation instruction of the Bluetooth terminal by using a user interface; and after the authorization confirmation instruction is received, identifying the Bluetooth terminal as the authorized device.

11. The wide area network terminal according to claim 8, wherein:

the network access request is forwarded to the wide area network by using a Bluetooth network sharing function.

12. The wide area network terminal according to claim 11, wherein, the at least one processor is further configured to execute the computer readable instructions to implement:

after the network access request is forwarded to the wide area network, when a new network access request is not received within a preset time, turning off the Bluetooth network sharing function.

13. The wide area network terminal according to claim 8, wherein, the at least one processor is further configured to execute the computer readable instructions to implement:

automatically activating a Bluetooth network sharing function before forwarding the network access request to the wide area network when the Bluetooth terminal is the authorized device.

* * * * *